United States Patent [19]
Von Esch et al.

[11] 3,818,103

[45] June 18, 1974

[54] METHOD FOR COMBATING HERPES SIMPLEX VIRUS

[75] Inventors: Anne Mary Von Esch, North Chicago; Adolph Oscar Geiszler, Mundelein, both of Ill.

[73] Assignee: Abbott Laboratories, North Chicago, Ill.

[22] Filed: Oct. 10, 1972

[21] Appl. No.: 296,354

[52] U.S. Cl. .................................................. 424/317
[51] Int. Cl. .......................................... A61k 27/00
[58] Field of Search ..................................... 424/317

[56] References Cited
OTHER PUBLICATIONS

Antibiotic News, Vol. 5, No. 9, October 1968, pages 1 and 3.

*Primary Examiner*—Jerome D. Goldberg
*Attorney, Agent, or Firm*—Robert L. Niblack; Gildo E. Fato

[57] ABSTRACT

A method of treating herpes simplex infections in animals by administering sulfonoacetic acid or its salts.

Although herpes simplex is a very common though minor disease, the only basic treatment presently available is the application of idoxuridine.

2 Claims, No Drawings

METHOD FOR COMBATING HERPES SIMPLEX VIRUS

The invention relates to a method of treating the effects of herpes simplex infections comprising, administering to an infected warm-blooded animal sulfonoacetic acid and its salts, the structure of sulfonoacetic acid being as follows:

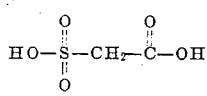

The compounds are active against herpes simplex virus and are administered either as the acid or as the alkali metal salts particularly the mono, di, or trisodium salt. The compounds are administered topically. The disodium compound causes a 30–40% reduction in mortality in mice infected with herpes simplex.

The effectiveness of the disodium salt of sulfonoacetic acid against herpes simplex infection in mice was determined in the following manner. Mice were infected with herpes simplex virus, type 2 and treated as indicated with the disodium salt two hours post infection and twice a day each of the five days thereafter. Virus inoculation was accomplished by plucking the fur from the flank and back of anesthetized mice and placing a drop (0.05 ml) of herpes virus on the surface of the plucked skin. Using a needle, the skin of the mouse was pricked through the drop of virus. The mice utilized for control purposes were not treated in any manner.

| Concentration | Administration Route | Percent Survivors | %Reduction in Mortality |
|---|---|---|---|
| Virus Controls | | 40 | |
| 2% | Topical | 70 | 30 |

From an examination of the results, it is apparent that the disodium salt of sulfonoacetic acid is active when administered topically at a concentration of 2 percent.

The compounds of the present invention can be dispensed in compositions comprising the active ingredients and excipients. The amount of active ingredient to be given daily depends on many factors such as the age and size of the warm-blooded animals and the severity of infection. When applied topically, an ointment containing from 0.2 to 10% active ingredient is suitable. The compounds can be formulated for use in a conventional manner well-known in the art, utilizing pharmaceutical excipients such as lactose, starch, magnesium stearate, glyceryl mono or di-stearate, talc or the like.

We claim:

1. A method for treating herpes simplex virus infections in an animal which comprises topically administering to an animal so infected a composition containing from about 0.2% to about 10% of disodium sulfonoacetate.

2. The method of claim 1 wherein said composition comprises an ointment containing 2% disodium sulfonoacetate.

* * * * *